United States Patent [19]

McLaren et al.

[11] Patent Number: 4,850,636
[45] Date of Patent: * Jul. 25, 1989

[54] CARTRIDGE ASSEMBLY FOR A VEHICLE DOOR, A VEHICLE DOOR SHELL AND A DOOR ASSEMBLY

[75] Inventors: John W. McLaren, Beaverton; Jeffery D. Zawisza; Walter E. F. Rupprecht, both of Midland, all of Mich.

[73] Assignee: The Dow Chemical Company, Midland, Mich.

[*] Notice: The portion of the term of this patent subsequent to May 10, 2005 has been disclaimed.

[21] Appl. No.: 98,593

[22] Filed: Sep. 17, 1987

Related U.S. Application Data

[63] Continuation-in-part of Ser. No. 909,820, Sep. 19, 1986, Pat. No. 4,743,062.

[51] Int. Cl.[4] .................................................. B60J 5/04
[52] U.S. Cl. ........................................ 296/146; 49/502
[58] Field of Search ................... 296/146, 188; 49/502

[56] References Cited

U.S. PATENT DOCUMENTS

| | | | |
|---|---|---|---|
| 3,700,076 | 10/1972 | Forsting et al. | 49/502 |
| 3,718,364 | 2/1973 | Fisher et al. | 296/146 |
| 3,782,036 | 1/1974 | Clark et al. | 49/502 |
| 3,791,693 | 2/1974 | Hellriegel et al. | 296/146 |
| 3,938,288 | 2/1976 | Roudinet | 296/146 |
| 4,090,734 | 5/1978 | Inami et al. | 296/146 |
| 4,434,580 | 3/1984 | Engelsberger et al. | 296/146 |

FOREIGN PATENT DOCUMENTS

| | | |
|---|---|---|
| 2021906 | 11/1971 | Fed. Rep. of Germany . |
| 48-31622 | 4/1973 | Japan . |
| 54-20423 | 2/1979 | Japan . |
| 55-87817 | 6/1980 | Japan . |
| 142714 | 11/1981 | Japan . |
| 154321 | 11/1981 | Japan . |

*Primary Examiner*—Robert R. Song
*Attorney, Agent, or Firm*—Timothy S. Stevens; Burke M. Halldorson; John K. McCulloch

[57] ABSTRACT

A method of assembling a door and a door assembly comprising an outer door shell and inner door supporting member therefor. The supporting member is hinged at one end to a door frame. The other end of the supporting member is slidably accommodated in and occupies the outer door shell through an aperture in a lateral edge of the door shell. The supporting member can carry a window glass holder, such as a channel strip screwed to the supporting member, and this combination is called a cartridge assembly. The cartridge assembly provides specific benefits for automobile and truck door applications where the cartridge assembly can have attached to it various window and latch components; such as the window glass regulator (including any electric motor and wiring therefor), the window glass guides, the window glass, door latch parts, latch operating and locking parts (including any electric actuators and wiring therefor) as well as a side impact resistant beam; before the outer door shell is slid over the cartridge assembly. The invention eliminates the need to manually install the various window and latch components inside a hollow door through apertures in the door.

34 Claims, 2 Drawing Sheets

CARTRIDGE ASSEMBLY FOR A VEHICLE DOOR, A VEHICLE DOOR SHELL AND A DOOR ASSEMBLY

CROSS-REFERENCE TO RELATED APPLICATION

This application is a continuation-in-part of the copending application Ser. No. 909,820, filed Sept. 19, 1986, now U.S. Pat. No. 4,743,062, which application is herein fully incorporated by reference.

FIELD OF THE INVENTION

This invention relates to doors and particularly to doors for vehicles such as automobiles and trucks.

BACKGROUND OF THE INVENTION

In the assembly of a vehicle, the fitting of a door to the vehicle frame is generally one of the most labor intensive and time consuming operations. This is due to the necessity of performing a number of intricate, manipulative operations in assembling the window glass and window glass operating mechanism, and the door latch and latch operating mechanism, to a generally hollow door, i.e. a door shell, after the door has been fitted and mounted to the vehicle door frame. In almost all cases, the door is mounted to the door frame by hinges which are attached to one edge of the door shell. Often times, the window and latch mechanisms also include electric motors, electric actuators and associated wiring. Regardless of whether the vehicle door is formed of a metal, a plastic material, or a combination of metal and plastic, the window glass, window glass operating mechanism, door latch and latch operating mechanisms, electric motors, actuators, and associated wiring (all of which are hereinafter generally called "the window and latch components") are generally assembled in a space or cavity between a pair of inner and outer panels which comprise the door shell. Modern vehicles conventionally also include a decorative inner finish or trim panel overlying the inner door panel. In some instances the trim panel is omitted from the door until the door is fitted and mounted to the vehicle door frame and the window and latch components are installed. Thereafter, the trim panel may be fitted to the inner door panel after which the operating levers, cranks, and switches are connected to their respective operating mechanisms and wires.

In other current door assembly operations a hollow door may be fitted with a side impact resistant beam to better provide protection for the vehicle occupants against transversely applied impacts. The presence of such a beam increases the difficulty of installing the window and latch components in the narrow space between the inner and outer door-forming panels. In such manual installations, the installer must utilize relatively small openings provided in the inner panel to effect mounting and wiring of the various window and latch components. Thereafter, the inner trim panel is mounted on the inner door panel and the operating cranks, levers, and/or switches are installed in a final assembly operation.

Regardless of the methods currently used to assemble a door on a vehicle and to incorporate in such a door a side impact resistant beam and window and latch components, the manual assembly of all of these components into a door is often laborious, time consuming, and may even result in injury to the hands and arms of the assembler due to the movement of their hands and arms through the openings in the inner panel, which exposes the hands and arms to the sharp edges of the panel openings.

SUMMARY OF THE INVENTION

The principal object of the present invention, therefore, is to provide a cartridge assembly for a vehicle door; a rapid and effective method of assembling the cartridge assembly; a vehicle door, and to a method of assembling the door on a vehicle frame. All of these objects materially minimize or overcome the above mentioned difficulties of installing the window and latch components through openings in the door shell. The invention has several embodiments which will now be summarized.

In one embodiment, the invention is a vehicle door cartridge assembly comprising three elements. The first element is a supporting member having one end and another end, e.g., the supporting member can take the shape of an elongated box beam. The supporting member can be of such strength that it constitutes an integral side impact resistant beam. However, it is often more economical to attach a side impact resistant beam, generally of heat treated steel, to the supporting member. The second element is a means, such as one or more hinges, attached to the supporting member and positioned near the one end of the supporting member for moveably mounting the supporting member to a vehicle door frame which defines a doorway. The third element is a means attached to the supporting member for holding a window glass. The means for holding the window glass can be adjustable so that the window glass can be moved in opposite directions relative to the supporting member. The supporting member can also have attached to it the door latching parts for latching the cartridge assembly to the door frame.

In another embodiment, the invention is a vehicle door for mounting to a vehicle door frame by way of sliding the door onto a cartridge assembly, the cartridge assembly having one end and another end, the cartridge assembly mounted to the door frame by hinges for swinging movement of the cartridge assembly relative to the door frame, the hinges positioned near the one end of the cartridge assembly, the door comprising at least one panel and a forward lateral edge. The door has an aperture in this forward lateral edge so that the door can be slid onto the cartridge assembly by aligning the other end of the cartridge assembly with the aperture and then sliding the door onto the cartridge assembly. The door can have a means for guiding the door onto the cartridge assembly such as channel strips positioned on the door so that the cartridge assembly engages the channels and is thereby guided.

In another embodiment, the invention is a door assembly comprising four elements. The first element is a door having a cavity therein and an aperture in a lateral edge thereof in communication with the cavity. The second element is a supporting member slidably accommodated in and occupying the cavity through the aperture. The third element is a means for securing the supporting member to the door such as conventional nuts and bolts, adhesives or welding. The supporting member structurally reinforces the assembly. The fourth element is a means, such as one or more hinges, oarried by the supporting member and positioned near the one end of the supporting member for moveably mounting the door assembly to a door frame. The assembly can be used for almost any door application including building doors, aircraft doors, marine doors, appliance doors, office equipment doors and especially vehicle doors including driver, passenger, tailgate and hatch-back doors and even trunk and engine compartment closures. The supporting member can have attached to it: the window glass regulator for rolling the window up and down: door latching parts for latching the assembly to the door frame; door latch locking parts for locking the door latch; and a side impact resistant beam which is often required by governmental regulations to better protect passengers in the event of a vehicle accident involving, for example, an impact to a vehicle door.

In another embodiment, the invention is a method of assembling a vehicle door cartridge assembly, for a vehicle door of the windowed type, the cartridge assembly having a supporting member. The supporting member having an end and positioned near the end is a means, such as one or more hinges, for moveably mounting the supporting member to a vehicle door frame. The method comprises the step of attaching a window glass holder to the supporting member for holding a window glass. The window glass holder can be of the adjustable type, e.g., a so called "regulator," so that the holder can be moved in opposite directions relative to the supporting member.

In another embodiment, the invention is a method of assembling a door, having a cavity therein, to a door frame defining a doorway. The method comprises four steps. The first step is to moveably mount, e.g., hinge mount, one end of a cartridge assembly to the door frame. The second step is to introduce the other end of the cartridge assembly through an aperture in one lateral edge of the door, the aperture in communication with the cavity. The third step is to slide the door longitudinally of the cartridge assembly to accommodate the latter in the cavity. The fourth step is to secure the door to the cartridge assembly by, for example, welding, gluing or bolting. The method can further include the steps of: assembling to the cartridge assembly an adjustable position window glass holder and a window glass held by the holder: and assembling to the cartridge assembly a side impact resistant beam; all before the step of introducing the other end of the cartridge assembly through he aperture.

BRIEF DESCRIPTION OF THE DRAWINGS

Apparatus constructed in accordance with the invention is disclosed in the following description and in the accompanying drawings, wherein.

DETAILED DESCRIPTION OF THE INVENTION

Figure 1:
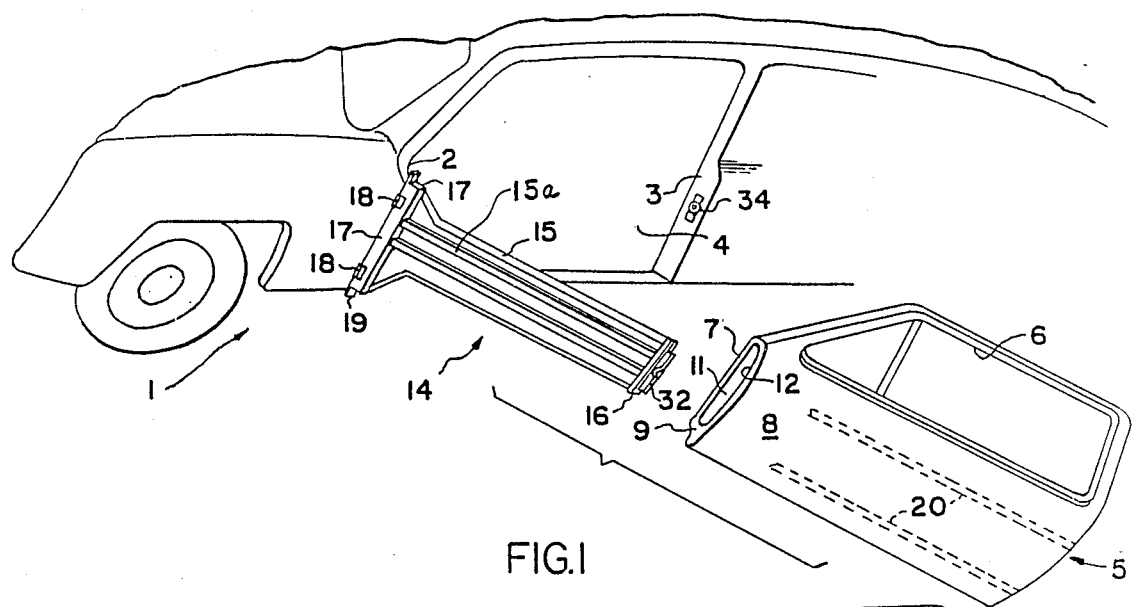
FIG. 1 is a fragmentary, diagrammatic, isometric view of the essential components of the invention.
Figure 2:
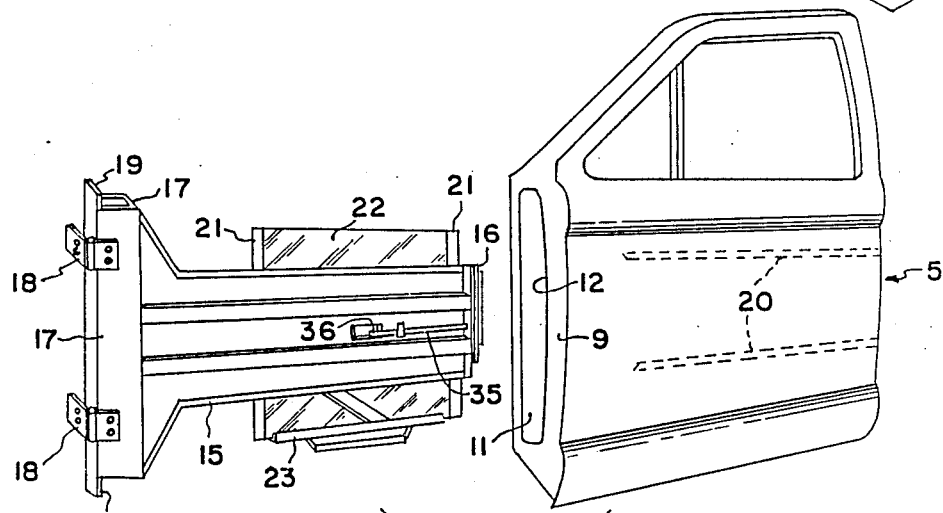
FIGS. 2 and 3 are views similar to FIG. 1, but component parts in more detail.
Figure 3:
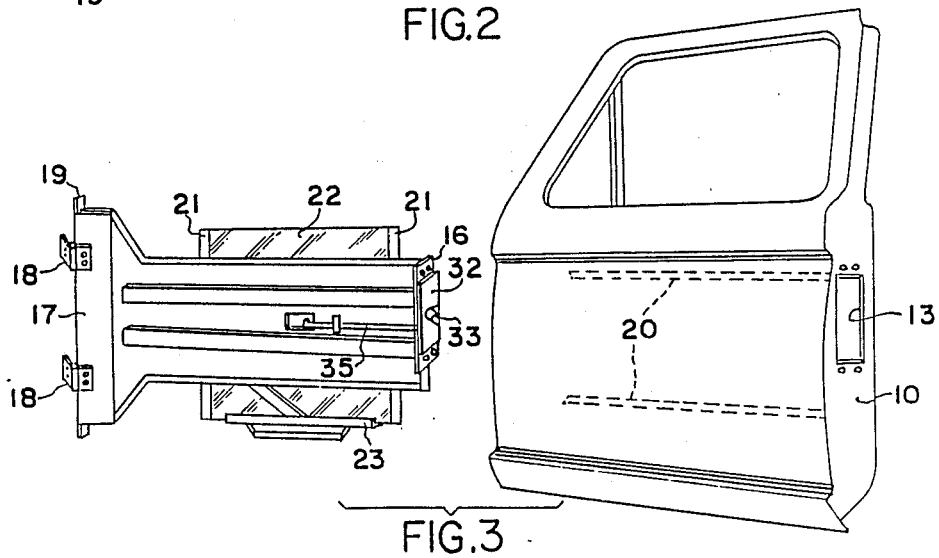

With particular reference to FIGS. 1 to 4, the invention is adapted for use with an automotive vehicle 1 having a chassis provided with spaced apart forward and rearward door frame members 2 and 3, respectively, forming a doorway 4 to facilitate ingress and egress to and from the interior of the vehicle. It will be understood that with regard to vehicles, the present invention is applicable to all transportation vehicles such as automobiles and trucks. The vehicle conventionally is equipped with a door shell 5, i.e., a generally hollow door, having an opening 6 therein that normally may be closed by a window glass (not shown in FIG. 1). Th door shell may be formed of metal, or plastic, or a combination thereof and includes an inner panel 7 and an outer panel 8 spaced from one another at opposite ends of the door by a web 9 (FIG. 2) and a web 10 (FIG. 3). It will be understood that the web may be one or more strips of metal or plastic material that can be welded or bonded to the inner and outer panels to form the door shell 5. Alternatively, it is also possible to form one of the inner or outer panels, or both of the panels, with a flange portion which can be welded or otherwise bonded or attached to the other of the panels to form the door shell having a cavity or chamber 11 that extends between the panels and over the full length of the door shell. The web 9, at the forward lateral edge of the door shell, is provided with an aperture 12 and the web 10, at the rearward lateral edge of the door shell, is provided with an aperture 13. The term "forward" is defined by the normal direction of travel of the vehicle. Both of the apertures 12 and 13 are in communication with the cavity 11.

It is conventional practice at the present time to provide automobile vehicle doors with a heat treated steel side impact resistant beam positioned between the inner and outer door panels and that extend longitudinally of the door to provide additional protection for the vehicle occupants against transversely and/or longitudinally directed impacts. Conventionally, the side impact resistant beam is applied by welding or otherwise securing it to one of the door panels prior to securing the two panels to one another. In accordance with the invention, however, a door cartridge assembly 14 comprises a supporting member 15 having one end and another end, preferably having a box-like configuration; formed of steel, fiber reinforced synthetic resinous material, or the like, and having an enlarged portion 17 at the one end and an end plate 16 at the other end. The supporting member 15 can be of such strength that it constitutes an integral side impact resistant beam. However, it is often more economical to attach a separate side impact resistant beam 15a to the supporting member 15. In the preferred embodiment of the invention the enlarged portion 17 is provided with a pair of vertically spaced hinges 18 adapted to be secured in any suitable way to the forward frame member 2 of the vehicle, thereby enabling the supporting member 15 to be swung about a generally vertical axis. It is entirely possible to provide a single hinge extending over the entire length or width of the enlarged portion 17. It is preferred, however, to provide a pair of spaced hinges on the enlarged portion 17, as illustrated in the drawings. Means other than hinges can be used to mount the supporting member 15 to the vehicle door frame member 2 so that the supporting member 15 can be moved relative to the frame member 2. For example, the supporting member 15 can be slide mounted to the vehicle 1. The cartridge assembly 14 comprises at least a means attached to the supporting member 15 and positioned near the one end for moveably mounting the supporting member 15 to the vehicle door frame and a means (to be described in detail below) carried by the supporting member 15 for holding a window glass.

To assemble the cartridge assembly 14 in the door shell 5, the other end of the supporting member 15 is introduced into the door cavity 11 by aligning the supporting member 15 with the aperture 12 and sliding the door shell 5 over the supporting member 15 until the web portion 9 engages a pair of flanges 19 at opposite ends of the enlarged portion 17. To facilitate such relative movement of the door shell 5 and supporting member 15, the door shell 5 is equipped with guide members 20 on either or both of the inner and outer panels (preferably on the inner panel 7 when the outer panel is made of steel) and on which the supporting member 15 may be supported and/or guided. The guides 20 are recessed inwardly of the forward end of the cavity 11 to avoid interference with the enlarged portion 17 of the supporting member 15.

The door shell 5, shown in FIGS. 1-4, is shown as being a preassembled unit comprising the outer panel 8 and the inner panel 7. However, it should be understood that the door shell 5 could be of the type where, for example, the inner panel was a separate part from the outer panel. In this event, either one of the panels oould be attached first to the cartridge assembly 14 and then the other panel attached to the cartridge assembly 14.

The length of the supporting member 15 preferably corresponds substantially to the length of the door, thereby enabling the end plate 16 of the supporting member 15 to abut the rearward web portion 10. In these positions of the parts, the flanges 19 and the end plate 16 may be bolted, welded, or otherwise suitably fixed to the respective web portions 9 and 10 so as to secure the door shell 5 and cartridge assembly 14 to one another in assembled relation. When the door shell and cartridge assembly 14 are assembled, the outer panel 8 of the door shell 5 overlies and obscures the flanges 19.

If the window opening 6 is one in which a vertically moveable windowpane or glass is to be accommodated, the cartridge assembly 14 includes a pair of spaced apart guide rails 21 secured to the supporting member 15 and between which a window glass 22 is slidably accommodated. The material of construction of the window glass 22 is not critical in the invention and can be, for example, tempered safety glass, laminated safety glass or a polymer such as scratch resistant treated polycarbonate. Operating means 23 for raising and lowering the window glass comprises a crank arm 24 pivoted at 25 to the supporting member 15 and terminating at one end in a pin 26 that is accommodated in a slot 27 formed in a channel-shaped glass holder 28 in which the lower end of the windows glass 22 is secured in a conventional manner.

The opposite end of the crank arm 24 carries a toothed gear segment 29 which meshes with a pinion gear 30 that is fixed on a pin 31 journaled in the supporting member 15. Rotation of the pinion gear 30 in one direction raises the glass 22 and rotation of the pinion gear in the opposite direction lowers the glass, as is conventional.

Although the mechanism for raising and lowering the window glass is disclosed as being manually operable, it will be understood that conventional, electrical, or other operating mechanisms can be used, if desired, and preferably is attached to the cartridge assembly 14.

It is preferred that the end plate 16 at the other end of the beam 15 be fitted with a carrier 32 (FIGS. 1 and 3) on which is mounted a portion of a conventional door latch 33 which cooperates with a complementary portion 34 (FIG. 1) mounted on the rearward frame member 3 of the vehicle. The latch itself forms no part of the invention and may constitute any suitable, conventional latch mechanism. An operating link 35 of conventional construction is mounted on the supporting member 15 to enable release of the latch to be effected when desired. The link 35 includes a tongue 36 that projects toward the inner door panel 7 that is provided with an appropriate opening for the accommodation of a door handle 37 that is connected to the tongue 36. A window crank 36a is connected to the pin 31 so as to enable the window operating mechanism to be operated from within the vehicle.

Although not shown, the door is preferably fitted with an external latch release of conventional construction to enable the door to be opened from outside the vehicle.

Figure 4:
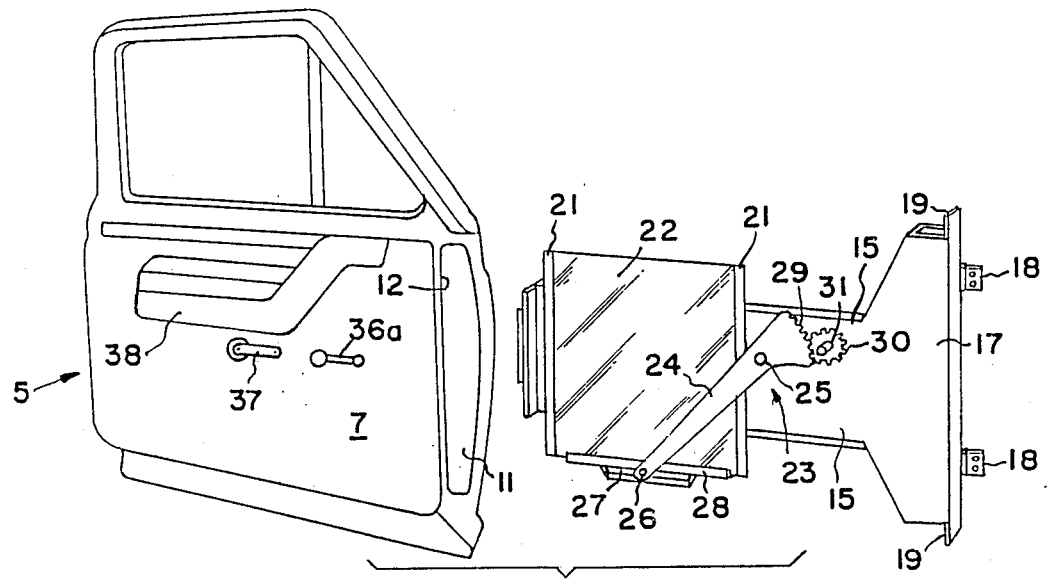
FIG. 4 is a view similar to FIG. 2, but illustrates the opposite sides of the components.

As is shown in FIG. 4, the inner panel 7 is fitted with appropriate decorative material, including an arm rest 38, as an integral part of the panel. It will be understood, however, that if the inner panel is constructed of a metal or plastic member, a separate trim panel may be removably or permanently secured to the panel 7.

Figure 5:
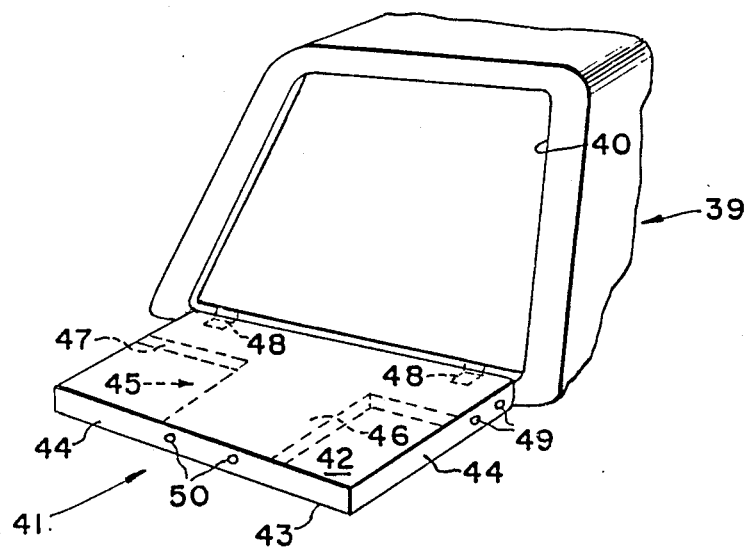
FIG. 5 is a fragmentary, isometric, largely diagrammatic view illustrating the application of the door to the tailgate of a station wagon.

FIG. 5 illustrates the rear end of a station wagon 39, or the like, having an opening 40 that normally is closed by a tailgate 41. The tailgate has inner and outer panels 42, 43 that are spaced apart by a web or flange 44 so as to provide a cavity for the accommodation of a T-shaped cartridge assembly 45. The cartridge assembly 45 comprises a supporting member 46 provided with an enlargement 47 at one end. The cartridge assembly 45 may be slid into the tailgate between the panels 42 and 43 via an opening (not shown) formed in the web between the panels at the lower end of the tailgate.

The enlargement 47 includes hinges 48 by means of which the cartridge assembly 45 is hinged to the body of the station wagon for swinging movements about a substantially horizontal axis. Suitable bolts 49, or the like, secure opposite ends of the enlargement 47 to the adjacent web portion 44 of the tailgate. The free end of the supporting member 46 abuts the endmost web portion 44 of the tailgate and is fixed to the latter by suitable bolts 50, or the like.

Although not shown, it will be understood that at least a window glass holding means and preferably an adjustable window glass holding means, i.e., a "regulator," as well as tailgate latch operating means, may be incorporated in the cartridge assembly 45 in a manner like that disclosed in the earlier described embodiment. It also will be understood that the embodiment shown in FIG. 5 is equally applicable to those vehicles which have a door or tailgate hinged at an upper end thereof.

Several significant advantages accrue from the invention disclosed herein. For example, the ability to secure the window glass, its adjusting mechanism, and the door latch and its operating linkage to the cartridge assembly prior to its assembly with the door shell facilitates greatly the mounting of a door onto a door frame, particularly the door frame of a vehicle. Further, the ability of the cartridge assembly to be hinged to the vehicle frame prior to its asembly with the door shell greatly facilitates mounting of the door to the vehicle frame. In addition, the ability of a vehicle door to be assembled by first hingedly mounting the cartridge assembly to the frame and then mounting the door shell by relative sliding movement of the door shell onto the cartridge assembly, enables an extremely fast and easy assembly to be achieved.

An additional advantage of providing hinges on the cartridge assembly rather than on the door shell itself is that a substantially closer fit can be obtained between the leading edge of the door and the adjacent edge of the vehicle body at the forward frame member 2. In conventional constructions the hinges are carried by the door shell and are mounted on the web thereof and are so positioned as to be wholly concealed when the door is in its closed position. As a oonsequence, the leading edge of the outer door panel must pass inwardly of the trailing or confronting edge of the adjacent fender or body member of the vehicle when the door is swung open. To ensure such movement without binding engagement between these leading and trailing edges, they usually are spaced apart by an undesirably large gap or margin. In the present invention, however, the leading edge of the outer door panel need not move inwardly of the trailing edge of the confronting body member upon opening of the door. Thus, the relatively large margin heretofore required by conventional constructions is not required in the construction herein disclosed.

In the preferred embodiment, the length of the cartridge assembly corresponds substantially to the length of the doorway and a side impact resistant beam is attached to the cartridge assembly. The advantage of this relationship is that, when the door is in a closed position, any impact to which the vehicle may be subjected is less likely to cause collapse of the vehicle by crushing of the door and consequent failure of the vehicle frame on opposite sides of the doorway.

It is contemplated that in addition to vehicle doors, the present invention also provides benefits for almost any door application including building doors, aircraft doors, marine doors, appliance doors, and office equipment doors. For example, a building door frame could have a supporting member hinged to it and a decorative door shell could be slid over and secured to the supporting member. One benefit of this embodiment of the present invention is that a single door frame and supporting member could be combined with any one of a number of door shells of differing architectural design.

The disclosed embodiments are representative of presently preferred forms of the invention, but are intended to be illustrative rather than definitive thereof. The invention is defined in the claims.

What is claimed is:

1. A vehicle door cartridge assembly for insertion into a lateral opening of a vehicle hell, the door shell including an inner panel and an outer panel, the cartridge assembly comprising:
   a supporting member having one end and an other end, the supporting member having no said inner or outer panel attached thereto;
   means attached to the member and positioned near the one end of the member for moveably mounting the member to a vehicle door frame which defines a doorway; and
   means attached to the member for holding a window glass.

2. The cartridge assembly of claim 1 further comprising means for moving the means for holding the window glass in oposite directions relative to the supporting member.

3. The cartridge assembly of claim 2 wherein the means for moveably mounting the supporting member to the door frame includes at least one hinge so that the member can be hingeably mounted to a vehicle door frame for swinging movement of the member relative to the doorway.

4. The cartridge assembly of claim 3 wherein the supporting member is of such length as substantially to span the doorway.

5. The cartridge assembly of claim 4 further comprising means attached to the supporting member and positioned near the other end of the member for latching the cartridge assembly to the door frame.

6. The cartridge assembly of claim 5 further comprising means carried by the supporting member and connected to the latch means for operating the latch means.

7. The cartridge assembly of claim 6 further comprising a side impact resistant beam attached to the supporting member.

8. A vehicle door for mounting to a vehicle door frame by way of sliding the door onto a cartridge assembly, the cartridge assembly having one end and an other end, the cartridge assembly mounted to the door frame by hinges for swinging movement of the cartridge assembly relative to the door frame, the hinges positioned near the one end of the cartridge, the door comprising at least one panel and a forward lateral edge, the edge having an aperture there through so that the door can be slid onto the cartridge assembly by aligning the other end of the cartridge with the aperture and then sliding the door onto the cartridge.

9. The door of claim 8 further comprising a means carried by the door for guiding the door onto the cartridge assembly when the door is slid onto the cartridge assembly.

10. A door assembly, comprising:
    a door having a cavity therein and an aperture in a lateral edge thereof in communication with the cavity:
    a supporting member having one end and an other end, the member slidably accommodated in and occupying the cavity through the aperture:
    means for securing the member to the door, the member structurally reinforcing the assembly: and
    means carried by the member and positioned near the one end of the member for moveably mounting the door assembly to a door frame.

11. The assembly of claim 10 wherein the door assembly is a vehicle door assembly.

12. The assembly of claim 11 wherein the means for moveably mounting the assembly includes at least one hinge so that the assembly can be hingeably mounted to a vehicle door frame for swinging movement of the assembly relative to the door frame.

13. The assembly of claim 12 wherein the supporting member is wider at the one end thereof than at the other.

14. The assembly of claim 11 wherein the door defines a slot in communication with the cavity through which slot a window glass may pass, and further comprising a means carried by the supporting member for holding the glass.

15. The assembly of claim 14 further comprising means carried by the supporting member for guiding the glass through the slot.

16. The assembly of claim 15 further comprising means connected to the glass nolding means for moving the glass in opposite directions relative to the slot.

17. The assembly of claim 11 further comprising means attached to the supporting member and positioned near the other end thereof for latching the assembly to the door frame.

18. The assembly of claim 17 further comprising means carried by the supporting member and connected to the latch means for operating the latch means.

19. The assembly of claim 11 further comprising a side impact resistant beam attached to the supporting member.

20. The assembly of claim 11 further comprising means carried by the door in engagement with the supporting member for positioning the member in the door.

21. The assembly of claim 12 wherein the door defines a slot in communication with the cavity through which slot a window glass may pass, and further comprising:
means carried by the supporting member for holding the glass:
means carried by the supporting member for guiding the glass through the slot:
means connected to the glass holding means for moving the glass in opposite directions relative to the slot; and
means carried by the door in engagement with the supporting member for positioning the supporting member in the door.

22. The assembly of claim 21 further comprising a side impact resistant beam attached to the supporting member.

23. A method of assembling a vehicle door cartridge assembly for a vehicle door of the windowed type, the cartridge assembly suitable for insertion into a lateral opening of a vehicle door shell, the door shell including an inner panel and an outer panel, the cartridge assembly having a supporting member, the supporting member having no said inner or outer panel attached thereto, the supporting member having an end, positioned near the end is a means for moveably mounting the supporting member of a vehicle door frame, the method comprising the step of:
attaching a window glass holder to the supporting member for holding a window glass.

24. The method of claim 23 wherein the window glass holder is adjustable so that the holder can be moved in opposite directions relative to the supporting member.

25. A method of assembling a vehicle door cartridge assembly for a vehicle door of the windowed type, the cartridge assembly suitable for insertion into a lateral opening of a vehicle door shell, the door shell including an inner panel and an outer panel, the cartridge assembly having a supporting member, the supporting member having no said inner or outer panel attached thereto, the supporting member having an end, positioned near the end is at least one hinge for moveably mounting the supporting member to a vehicle door frame, the method comprising the step of:
attaching a window glass holder to the supporting member for holding a window glass.

26. The method of claim 25 wherein the window glass holder is adjustable so that the holder can be moved in opposite directions relative to the supporting member.

27. A method of assembling a door, having a cavity therein, to a door frame defining a doorway, the method comprising the steps of:
moveably mounting on end of a cartridge assembly to the door frame;
introducing the other end of the cartridge assembly through an aperture in one lateral edge of the door, the aperture in communication with the cavity:
sliding the door longitudinally of the cartridge assembly to accommodate the latter in the cavity: and
securing the door to the cartridge assembly.

28. The method of claim 27 wherein the step of moveably mounting one end of the cartridge assembly to the door frame is hinging one end of the cartridge assembly to the door frame.

29. The method of claim 27 wherein the method is a method of assembling a vehicle door, having a cavity therein, to a vehicle door frame.

30. The method of claim 29 wherein the step of moveably mounting one end of the cartridge assembly to the door frame is hinging one end of the cartridge assembly to the door frame.

31. The method of claim 30 further comprising the step of assembling a window glass to the cartridge assembly prior to the step of introducing the other end of the cartridge assembly through the opening.

32. The method of claim 30 further comprising the step of assembling to the cartridge assembly an adjustable position window glass holder and a window glass held by the holder prior to the step of introducing the other end of the cartridge assembly through the aperture.

33. The method of claim 30 wherein the cartridge assembly is of such length as substantially to span the doorway.

34. The method of claim 33 further comprising the step of assembling to the cartridge assembly a side impact resistant beam prior to the step of introducing the other end of the cartridge assembly through the aperture.

* * * * *

UNITED STATES PATENT AND TRADEMARK OFFICE
CERTIFICATE OF CORRECTION

PATENT NO. : 4,850,636

DATED : Jul. 25, 1989

INVENTOR(S) : John W. McLaren, Jeffery D. Zawisza, Walter E. F. Rupprecht

It is certified that error appears in the above-identified patent and that said Letters Patent is hereby corrected as shown below:

Col. 2, line 66, delete "oarried" and insert --carried.
Col. 3, line 9, after "down" delete the colon (:) and insert --;--;
      line 43, after "holder" delete the colon (:) and insert --;--;
      line 46, delete "he" and insert --the--;
      line 53, after "invention" delete the colon (:) and insert --;--;
      line 54, after "but" insert --illustrate the--.
Col. 4, line 8, delete "Th" and insert --The--.
Col. 5, line 22, delete "oould" and insert --could--.
Col. 6, line 61, delete "asembly" and insert --assembly--.
Col. 7, line 9, delete "oonsequence" and insert --consequence--.
Col. 7, Claim 1, line 49, delete "hell" and insert --door shell--.
      Claim 2, line 63, delete "oposite" and insert --opposite--.
Col. 8, Claim 10, line 35, after "cavity" delete the colon (:) and insert --;--;
            line 38, after "aperture" delete the colon (:) and insert --;--;
            line 40, after "assembly" delete the colon (:) and insert --;--.
Col. 8, Claim 16, line 63, delete "nolding" and insert --holding--.
Col. 9, Claim 21, line 15, after "glass" delete the colon (:) and insert --;--;
            line 17, after "slot" delete the colon (:) and insert --;--.

UNITED STATES PATENT AND TRADEMARK OFFICE
CERTIFICATE OF CORRECTION

PATENT NO. : 4,850,636

DATED : July 25, 1989

INVENTOR(S) : John W. McLaren, Jeffery D. Zawisza, Walter E.F. Rupprecht

It is certified that error appears in the above-identified patent and that said Letters Patent is hereby corrected as shown below:

Col. 10, Claim 27, line 13, delete "on" and insert --one--;

line 17, after "cavity" delete the colon (:) and insert --;--;

line 19, after "cavity" delete the colon (:) and insert --;--.

Signed and Sealed this

Third Day of July, 1990

*Attest:*

HARRY F. MANBECK, JR.

*Attesting Officer*　　　*Commissioner of Patents and Trademarks*